(12) United States Patent
Warner

(10) Patent No.: US 11,905,172 B2
(45) Date of Patent: Feb. 20, 2024

(54) HIGH ENERGY RECOVERY NITRIC ACID PROCESS USING LIQUID OXYGEN CONTAINING FLUID

(71) Applicant: YARA INTERNATIONAL ASA, Oslo (NO)

(72) Inventor: Maximilian Warner, Oslo (NO)

(73) Assignee: YARA INTERNATIONAL ASA, Oslo (NO)

( * ) Notice: Subject to any disclaimer, the term of this patent is extended or adjusted under 35 U.S.C. 154(b) by 579 days.

(21) Appl. No.: 17/264,892

(22) PCT Filed: Aug. 14, 2019

(86) PCT No.: PCT/EP2019/071786
§ 371 (c)(1),
(2) Date: Feb. 1, 2021

(87) PCT Pub. No.: WO2020/035521
PCT Pub. Date: Feb. 20, 2020

(65) Prior Publication Data
US 2021/0300759 A1 Sep. 30, 2021

Related U.S. Application Data

(60) Provisional application No. 62/764,976, filed on Aug. 17, 2018.

(30) Foreign Application Priority Data

Oct. 29, 2018 (EP) ..................... 18203076

(51) Int. Cl.
| | |
|---|---|
| C01B 21/40 | (2006.01) |
| C01B 21/26 | (2006.01) |
| C01B 21/36 | (2006.01) |
| C01C 1/04 | (2006.01) |
| B01J 19/24 | (2006.01) |
| C25B 1/04 | (2021.01) |
| F01K 23/00 | (2006.01) |

(52) U.S. Cl.
CPC ............ *C01B 21/40* (2013.01); *B01J 19/245* (2013.01); *C01B 21/26* (2013.01); *C01B 21/36* (2013.01); *C01C 1/0417* (2013.01); *C25B 1/04* (2013.01); *F01K 23/00* (2013.01)

(58) Field of Classification Search
CPC ......... C01B 21/40; C01B 21/26; C01B 21/36; C01B 21/28; B01J 19/245; C01C 1/0417; C01C 1/0405; C25B 1/04; F01K 23/00
See application file for complete search history.

(56) References Cited

U.S. PATENT DOCUMENTS

| | | |
|---|---|---|
| 3,450,498 A | 6/1969 | Sales |
| 3,506,396 A | 4/1970 | Dijk et al. |
| 3,977,832 A * | 8/1976 | Schofield ............ B01J 19/0006 422/111 |
| 4,818,494 A | 4/1989 | Eastin |
| 4,869,890 A | 9/1989 | Adams et al. |
| 4,957,720 A | 9/1990 | Wiegand et al. |
| 2008/0216478 A1 | 9/2008 | Cherry |
| 2013/0216461 A1 | 8/2013 | Suchak |

FOREIGN PATENT DOCUMENTS

| | | | |
|---|---|---|---|
| CA | 572124 A | 3/1959 | |
| CN | 105936501 A | 9/2016 | |
| DE | 3 903 571 A * | 8/1990 | ............ C01B 21/26 |
| EP | 0 381 826 A1 * | 8/1990 | ............ C01B 21/26 |
| EP | 3338883 A1 | 6/2018 | |
| GB | 1143946 A | 2/1969 | |
| RU | 2248322 C1 | 3/2005 | |
| RU | 2470856 C2 | 12/2012 | |
| WO | 20030070634 A1 | 8/2003 | |
| WO | 20130028668 A2 | 2/2013 | |

OTHER PUBLICATIONS

European Search Report issued in International Application No. EP18203075.9, dated Jan. 28, 2019, 7pages.
European Search Report issued in International Application No. EP18203076.7, dated Mar. 8, 2019, 7 pages.
European Search Report issued in International Application No. EP18203072.6, dated May 14, 2019, 5 pages.
International Search Report issued in International Application No. PCT/EP2019/071786, dated Dec. 3, 2019, 12 pages.
Notification of Transmittal of the International Preliminary Report on Patentability and IPRP in International Application No. PCT/EP2019/071786, dated Jul. 3, 2020, 17 pages.
M.M. Karavaev, A.P. Zasorin, and N.F. Kleshchev, Catalytic Oxidation of Ammonia. M.: Chemistry, 1983, Chapter 1 pp. 14-15.
R.A. Lidin, V.A. Molochko, L.L. Andreeva, Chemical properties of inorganic compounds, Moscow: Chemistry, 1997.
The Great Soviet Encyclopedia 3rd edition, Moscow, Soviet Encyclopedia, 1969-1978.

(Continued)

*Primary Examiner* — Timothy C Vanoy
(74) *Attorney, Agent, or Firm* — Dilworth IP, LLC

(57) ABSTRACT

A novel concept for a high energy and material efficient nitric acid production process and system is provided, wherein the nitric acid production process and system, particularly integrated with an ammonia production process and system, is configured to recover a high amount of energy out of the ammonia that it is consuming, particularly in the form of electricity, while maintaining a high nitric acid recovery in the conversion of ammonia to nitric acid. The energy recovery and electricity generation process comprises pressurizing a liquid gas, such as air, oxygen and/or $N_2$, subsequently evaporating and heating the pressurized liquid gas, particularly using low grade waste heat generated in the production of nitric acid and/or ammonia, and subsequently expanding the evaporated pressurized liquid gas over a turbine. In particular, the generated electricity is at least partially used to power an electrolyzer to generate the hydrogen needed for the production of ammonia. The novel concepts set out in the present application are particularly useful in the production of nitric acid based on renewable energy sources.

28 Claims, 5 Drawing Sheets

(56) References Cited

OTHER PUBLICATIONS

Russian Office Action (including partial translation) issued in App. No. RU2020143805/04, dated Jun. 29, 2022, 13 pages.

* cited by examiner

HIGH ENERGY RECOVERY NITRIC ACID PROCESS USING LIQUID OXYGEN CONTAINING FLUID

FIELD OF THE INVENTION

The present invention relates to the technical field of chemical processing. In particular, the present invention generally relates to a nitric acid production process, particularly a nitric acid production process in combination with one or more processes situated upstream, and/or downstream of the nitric acid production, such as ammonia production, particularly ammonia production using hydrogen generated by electrolysis of water, and nitrate based fertilizer production, respectively. The present invention also relates to systems for performing the nitric acid production process according to the present invention.

BACKGROUND TO THE INVENTION

Nitric acid is typically produced by a multistep process wherein ammonia is oxidized to nitrogen oxides which are then absorbed by water to produce nitric acid. In the first step, anhydrous ammonia is oxidized with oxygen or air to nitric oxide (NO) and water (steam), in the presence of a catalyst (e.g. a platinum or rhodium based catalyst). This ammonia combustion step is a very exothermic process, and generally occurs at a temperature of about 700-1000° C. In the next step, the nitrogen monoxide contained in the ammonia combustion gas is further oxidized to nitrogen dioxide ($NO_2$) (e.g. in an oxidizer section). Finally, the nitrogen dioxide is absorbed in water (typically in a dedicated absorber) to yield the desired nitric acid. Before the absorption step, the water vapour (steam) contained in the ammonia combustion gas is condensed by cooling the combustion gas.

Modern nitric acid plants are operated under pressure in order to achieve higher acid concentrations and higher NO oxidation rates and efficiencies in the absorber. In monopressure plants, both the ammonia combustion and nitrogen oxides absorption are performed at moderate pressures (from 3 bara up to about 6 or 7 bara) or high pressure (between about 7 bara and 12 bara, up to 20 bara). In dual-pressure plants, the ammonia combustion takes place at moderate pressure of about 3 to 6 bara, while the absorption to yield nitric acid occurs at high pressure of 10 to 15 bara. These systems typically comprise an expansion turbine (referred to as a tail gas turbine) for recovering energy from the residual gas or tail gas before it is released into the atmosphere. In addition, in order to condense the gases and the water vapour from the ammonia combustor or burner, heat exchangers are applied between the burner and absorber. For instance, typically, in these systems, a waste heat boiler is installed after the catalyst section in the burner. Although the modern nitric acid plants thus comprise energy recovery systems, they generally have a poor ability to recover this energy, in particular for making electricity, also due to the large amount of low grade heat that is produced (low grade heat being referred to as heat of low economical value). Current technology for producing nitric acid recovers only around 25-30% of the combustion energy as exportable steam, and when using this steam to create electrical power, a thermal efficiency of typically less than 10% is obtained.

When producing ammonia using water electrolysis as hydrogen source, the process typically requires 9.5 MWh/$t_{NH3}$, of which about 90% is used by the electrolysers (see Grunt & Christiansen, International Journal of Hydrogen Energy 7 (1982) 247-257)). In addition, about 20% of the energy that is put into the electrolyzing units is released as low grade heat at 90° C.

Thus, only a small fraction of the energy required for the production of ammonia, which is consumed in the nitric acid production process, is recovered in the current nitric acid process.

Recently, solar photovoltaics (PV) and wind have started to outperform conventional (e.g. fossil fuel based) electrical energy production methods in terms of costs. It is widely expected that wind and solar energy will to be able to beat fossils fuels in increasingly more and more cases. This evolution opens up the possibility of producing so-called "green ammonia" and "green nitrates", wherein the energy demands of the production process is met by renewable energy sources.

However, an important issue in this context is the intermittency of renewable energy supply. This not only plays a huge role in the cost of production (i.e. operation at reduced load or even being idle for parts of the day), but, in an ammonia production process, this energy intermittency presents an important negative technical effect as well. In particular, unlike the electrolyzers, the current technology of a Haber Bosch loop does not allow the reactor to be started up and shut down multiple times: the catalyst in the process and the materials in the reactor are very sensitive to heating and cooling. Thus, the intermittency provided by renewables such as wind or solar energy can have adverse effects on this part of the process. Although the power intermittency may be overcome, for instance, by the use of batteries—such as in the case of solar power by storing energy during the day, and discharging during the night, this comes at a considerable capital cost, both in terms of the cost of the battery, but also the extra PV or wind units required to charge it.

Accordingly, there is a need for nitric acid production processes and systems, which are highly energy efficient and/or require less energy, and that are able to efficiently convert renewable electrical energy into ammonia, nitric acid and/or nitrates, in order to overcome at least partially the above mentioned disadvantages of using renewable energy sources.

SUMMARY OF THE INVENTION

A first aspect of the present application provides a process for producing nitric acid, comprising the steps of:
(a) catalytically combusting a mixture of ammonia and an oxygen containing fluid in an ammonia burner, thereby forming an ammonia combustion stream, wherein the stream comprises nitric oxide;
(b) oxidizing at least partially the nitric oxide in the ammonia combustion stream of step a) to form a stream comprising nitrogen dioxide;
(c) absorbing, by means of an absorber, the nitrogen dioxide in an aqueous solution, thereby forming a concentrated aqueous stream comprising nitric acid, wherein the oxygen containing fluid is supplied to the ammonia burner via an oxygen containing fluid supply line, wherein in at least one section of the oxygen containing fluid supply line the oxygen containing fluid is a liquid;
(d) increasing the pressure of the oxygen containing liquid in the oxygen containing fluid supply line thereby obtaining a pressurized oxygen containing liquid, wherein the pressurized oxygen containing liquid has a pressure of at least 10 bara, particularly at least 50 bara, more particularly at least 100 bara or at least 150 bara and even more particularly has a pressure between 150 and 250 bara;

(e) evaporating or boiling the pressurized oxygen containing liquid, in particular by heat recuperated downstream from the ammonia burner, thereby obtaining a pressurized oxygen containing gas; and (f) expanding the pressurized oxygen containing gas over a first turbine (200), which is particularly coupled to a generator (220) for generating electricity.

The oxygen containing fluid is particularly air, pure oxygen ($O_2$) or a mixture comprising oxygen ($O_2$). In particular, the mixture comprises at least 10 mol % $O_2$, more particularly at least 15 mol % $O_2$, even more particularly at least 20 mol % $O_2$, still even more particularly at least 50 mol % $O_2$, yet even more particularly at least 90 mol % $O_2$, and most particularly at least 95 mol % $O_2$. In particular, the process further comprises the step of mixing the oxygen containing fluid with ammonia prior to supplying the ammonia and the oxygen containing fluid to the ammonia burner, more in particular the mixing takes place in a mixing unit or mixing line. In the context of the present application, the mixing unit or mixing line is considered to form part of the oxygen containing fluid supply line.

The electricity may be supplied to one or more front end or upstream processes of the nitric acid production process, such as the electrolysis based production of hydrogen gas in an ammonia production process, and/or for operating an air separation unit for generating nitrogen gas for use in an ammonia production process. Advantageously, the electricity may be supplied to the front end or upstream processes when the supply of renewable energy is interrupted (e.g. at night for solar power).

In particular embodiments, the process for producing nitric acid according to the present invention further comprises the step of further heating or superheating the pressurized oxygen containing gas of step (e) via one or more heaters (122) configured for recuperating heat downstream from the ammonia burner (100), before expanding the pressurized oxygen containing gas in step (f).

According to the process of the present application, a liquid oxygen containing fluid is first pressurized (which requires substantially less energy than pressurizing the corresponding fluid in gaseous form), and is subsequently boiled and in particular further heated. Advantageously, the evaporation and further heating of the oxygen containing fluid can make use of low grade waste heat, i.e. at a temperature below 100° C. and lower. Thus, in particular embodiments, the further heating or superheating of the oxygen containing fluid, particularly the pressurized oxygen containing gas, is carried out with heat recuperated in the absorber; with heat recuperated in a condenser and/or with heat recuperated in a heat exchanger (cooling unit) downstream from the ammonia burner. In particular embodiments, the further heating or superheating the oxygen containing fluid, particularly the pressurized oxygen containing gas, is carried out in a stepwise manner, by first using low grade recuperated heat, such as heat recovered from the absorber and/or condenser units, and subsequently using recuperated heat of a higher grade recovered via heat exchangers from the NO or $NO_2$ containing stream before the condenser and the absorber. Stated differently, the pressurized oxygen containing gas is first heated using the low grade heat recovered from the absorber and/or condenser units (which operate at temperatures below 100° C.), before it is further heated/superheated using heat of a higher grade recovered via heat exchangers from the NO or $NO_2$ containing stream before the stream enters the condenser and the absorber.

Thus, the step of superheating the oxygen containing fluid, particularly the pressurized oxygen containing gas, is carried out by consecutively using the heat from two or more of the following sources, in sequence: (1) the absorber; (2) the condenser; (3) a heat exchanger upstream of the condenser, such as between the condenser and the oxidizer unit; and/or (4) a heat exchanger upstream of the oxidizer unit and downstream of the ammonia burner.

The nitric acid process according to the present application comprising the use of a liquid oxygen containing fluid, may be combined with a classical nitric acid process or systems, as mentioned in the background section, wherein the heat in the ammonia combustion gas (i.e. the stream comprising nitric oxide) is captured via one or more heat exchangers or condensers, located downstream of the ammonia burner and upstream of the absorber, and wherein the captured heat may be used to boil the pressurized oxygen containing liquid and/or for heating or superheating the pressurized oxygen containing gas. In addition, the nitric acid process according to the present application may also be combined with other energy recovery and electricity generating measures considered in the present novel concept for a highly energy and material efficient nitric acid production process and system.

In certain embodiments, the process of producing nitric acid further comprises the step of preheating the combustion mixture formed in the mixing line, in particular by heat recovered via a heat exchanger situated between the oxidizer unit and the condenser or between the oxidiser unit and the absorber.

In particular advantageous embodiments, the process for producing nitric acid further comprises the step of producing ammonia, prior to step (a), by catalytic conversion of $H_2$ and $N_2$ wherein the ammonia is subsequently combusted to generate NOx, and subsequently converted to nitric acid. Thus, in particular embodiments, the step of producing ammonia is configured for improving the energy and/or material efficiency. In particular embodiments, the process for producing nitric acid comprises the steps of:

(a) catalytically combusting ammonia in an ammonia burner in the presence of oxygen containing fluid, thereby forming a stream comprising nitric oxide;

(b) oxidizing at least partially the NOx in the stream comprising nitric oxide to form a stream comprising nitrogen dioxide;

(c) absorbing, by means of an absorber, nitrogen dioxide in an aqueous solution, thereby forming an aqueous stream comprising nitric acid, wherein the oxygen containing fluid is supplied to the ammonia burner via an oxygen containing fluid supply line, wherein in at least one section of the oxygen containing fluid supply line the oxygen containing fluid is a liquid;

(d) increasing the pressure of the oxygen containing liquid in the oxygen containing fluid supply line thereby obtaining a pressurized oxygen containing liquid, wherein the pressurized oxygen containing liquid has a pressure of at least 10 bara, particularly at least 50 bara, more particularly at least 100 bara or at least 150 bara and even more particularly has a pressure between 150 and 250 bara;

(e) evaporating or boiling the pressurized oxygen containing liquid, in particular by heat recuperated downstream from the ammonia burner, thereby obtaining a pressurized oxygen containing gas;

(f) optionally further heating and/or superheating the pressurized oxygen containing gas via one or more heaters configured for recuperating heat downstream from the ammonia burner and (g) expanding the pressurized oxygen containing gas, in particular the superheated oxygen containing gas over a first turbine (200), which is particularly coupled to a generator (220) for generating electricity;

and wherein the process further comprises the step of producing ammonia, prior to step (a), by catalytic conversion of $H_2$ and $N_2$ in a Haber-Bosch synthesis loop, particularly in a converter unit thereof, thereby obtaining an ammonia product stream, wherein nitrogen is supplied to the converter via a nitrogen supply line, wherein in at least one section of the nitrogen supply line the nitrogen is in a liquid state. In particular embodiments, the pressure of the liquid nitrogen is increased, particularly by using a cryogenic pump or compressor, particularly to a pressure of at least 10 bara, more in particular to at least 50 bara, even more in particular to at least 100 bara, still even more in particular to at least 150 bara or to a pressure ranging between 150 bara and 250 bara, and, in particular embodiments, subsequently the pressurized liquid $N_2$ is evaporated, thus obtaining pressurized gaseous $N_2$. The pressurised gaseous $N_2$ is mixed with compressed $H_2$, and with a compressed recycle stream comprising unreacted $N_2$ and $H_2$, thus creating a reaction mixture, which is provided to the converter unit in the Haber-Bosch loop, in particular after preheating such as by heat recovered downstream from the converter unit. The ammonia product stream leaving the converter unit is provided to a separator for separating the ammonia, in particular liquid ammonia obtained by cooling the ammonia product stream, from unreacted $H_2$ and $N_2$.

In particular embodiments, the separated ammonia is further evaporated and, optionally heated or superheated, particularly with heat recovered from the Haber-Bosch synthesis loop and/or in the nitric acid production process. Advantageously, the process further comprises the step of expanding the separated ammonia, in particular superheated ammonia, over a second turbine, in particular a high pressure turbine, which is particularly operationally coupled to a generator for generating electricity. In further advantageous embodiments, the process further comprises the step of cooling and condensing the expanded ammonia, and passing the condensed ammonia to an ammonia Rankine cycle based energy recovery system, wherein at least part of the produced ammonia is used as the working fluid before being provided to the ammonia burner and a third turbine is used to capture work from the ammonia working fluid.

Another aspect of the present application provides a system for producing nitric acid, in particular operationally coupled to a source of renewable energy, and particularly configured for executing one or more embodiments of a process according to the present application, wherein the system comprises an ammonia burner, comprising a catalyst, configured for catalytically combusting a combustion mixture comprising ammonia and air and/or oxygen at an elevated pressure, such as at a pressure between about 5.0 bara and 20.0 bara to form a stream comprising nitric oxide;

an oxygen supply line, configured for providing an oxygen containing fluid, such as $O_2$, air or oxygen-enriched air, to the ammonia burner;

an ammonia supply line, configured for providing ammonia to the ammonia burner;

an ammonia combustion gas outlet line, configured for removing a stream comprising nitric oxide from the ammonia burner, in fluid connection with an oxidizing section or oxidizer unit, configured for oxidizing the nitric oxide into nitrogen dioxide, with the oxidizing section in its turn in fluid connection with an absorber, configured for absorbing nitrogen dioxide in water, thereby yielding nitric acid;

wherein the oxygen supply line comprises an energy recovery system, wherein the energy recovery system comprises consecutively a means for pressurizing the oxygen containing fluid in the liquid state, to a pressure of at least 10 bara, in particular to at least 50 bara, more in particular to at least 100 bara, even more in particular to at least 150 bara or to a pressure ranging between 150 bara and 250 bara, such as a cryogenic pump; one or more heaters configured for evaporating and further heating of the pressurized oxygen containing fluid, and a first turbine, such as a high pressure turbine, configured for expanding the oxygen containing fluid (in gaseous form), particularly operationally coupled to a generator, wherein an outlet of the turbine is in fluid connection with an inlet of the ammonia burner. In particular embodiments, the first generator is in electrical connection with an electrolysis unit and/or air separation unit and/or an air liquefaction unit.

In particular embodiments, the nitric acid production system further comprises an ammonia production system, the ammonia production system comprising a Haber-Bosch synthesis loop, the Haber-Bosh synthesis loop comprising a $H_2$ inlet; a $N_2$ inlet; a converter unit configured for catalytically converting $H_2$ and $N_2$ into ammonia, thereby obtaining an ammonia product mixture, the converter unit comprising an ammonia product mixture outlet; a separator located downstream of the converter and configured for separating the ammonia product mixture in an ammonia stream and a stream comprising unreacted $H_2$ and $N_2$; means for recycling the unreacted $H_2$ and $N_2$, and an ammonia outlet; wherein the ammonia outlet is in fluid connection with the ammonia supply line of the nitric acid production. In particular embodiments, the ammonia production system further comprises an ammonia Rankine cycle based energy recovery system which is in fluid connection to the ammonia outlet, comprising a third turbine configured to extract work from the ammonia working fluid; a heat exchanger, an ammonia condenser in thermal connection with the $N_2$ supply line, in particular, in thermal connection with the $N_2$ supply line downstream of the means for pressurizing the liquid $N_2$ in the $N_2$ supply line; an ammonia circulation pump; and an ammonia outlet in fluid connection with the ammonia supply line.

The system according to the present invention may comprise one or more additional units.

In certain embodiments, the nitric acid production system further comprises an electrolysis unit, configured for decomposing water in $H_2$ and $O_2$ by means of an electrical current, in particular from renewable sources, the electrolysis unit comprising a water inlet and an $H_2$ outlet and a $O_2$ outlet; wherein the $H_2$ outlet of the electrolysis unit is in fluid connection with the $H_2$ inlet of the Haber-Bosch synthesis loop.

In certain embodiments, the nitric acid production system further comprises an air liquefaction unit, configured for converting gaseous air into liquid air; in fluid connection with the oxygen supply line.

In certain embodiments, the nitric acid production system further comprises an air separation unit, configured for the separation of air into $O_2$ and $N_2$, in particular into liquid $O_2$ and liquid $N_2$, the air separation unit comprising an $O_2$ outlet and a $N_2$ outlet, wherein the $O_2$ outlet of the air separation unit is in fluid connection with the oxygen supply line, and particularly wherein the $N_2$ outlet of the air separation unit is in fluid connection with the $N_2$ inlet of the Haber-Bosch synthesis loop.

In certain embodiments, the nitric acid production system further comprises one or more heat exchangers, configured for capturing the waste heat from the ammonia combustion process, and a condenser, for condensing the water in the ammonia combustion gas, wherein the one or more heat exchangers and condenser are situated downstream of the ammonia burner and upstream of the absorber unit, and wherein the one or more heat exchangers and condenser are in particular thermally coupled with the heaters located on the oxygen supply line.

In certain embodiments, the nitric acid production system further comprises a mixing unit in fluid connection and linked with the ammonia supply line and the oxygen containing fluid line, the mixing unit comprising a vessel, pipe or a reactor configured to mix the oxygen containing fluid and the ammonia to form a combustion mixture, prior to the introduction of the combustion mixture to the ammonia burner. In particular embodiments, a heat exchanger is provided between the mixing unit and the ammonia burner configured for heating the combustion mixture, such as using the heat recovered from the condenser.

In certain embodiments, the nitric acid production system further comprises a means for pressurizing the liquid $N_2$ in the $N_2$ supply line to a pressure of at least 100 bara, particularly to at least 150 bara, more particularly to a pressure between 150 bara and 250 bara, such as a cryogenic pump. In particular, the system further comprises a means to exchange heat between the liquid pressurized nitrogen and the ammonia Rankine cycle based energy recovery system.

In certain embodiments, the nitric acid production system further comprises a second turbine configured for expanding the ammonia stream separated in the separator, particularly operationally coupled to a generator.

The present application also provides for the use of a system according to an embodiment of the present application for performing the process according to an embodiment of the present application.

BRIEF DESCRIPTION OF THE FIGURES

The following description of the figures of specific embodiments as described herein is only given by way of example and is not intended to limit the present explanation, its application or use. In the drawings, identical reference numerals refer to the same or similar parts and features.

Figure 1A:
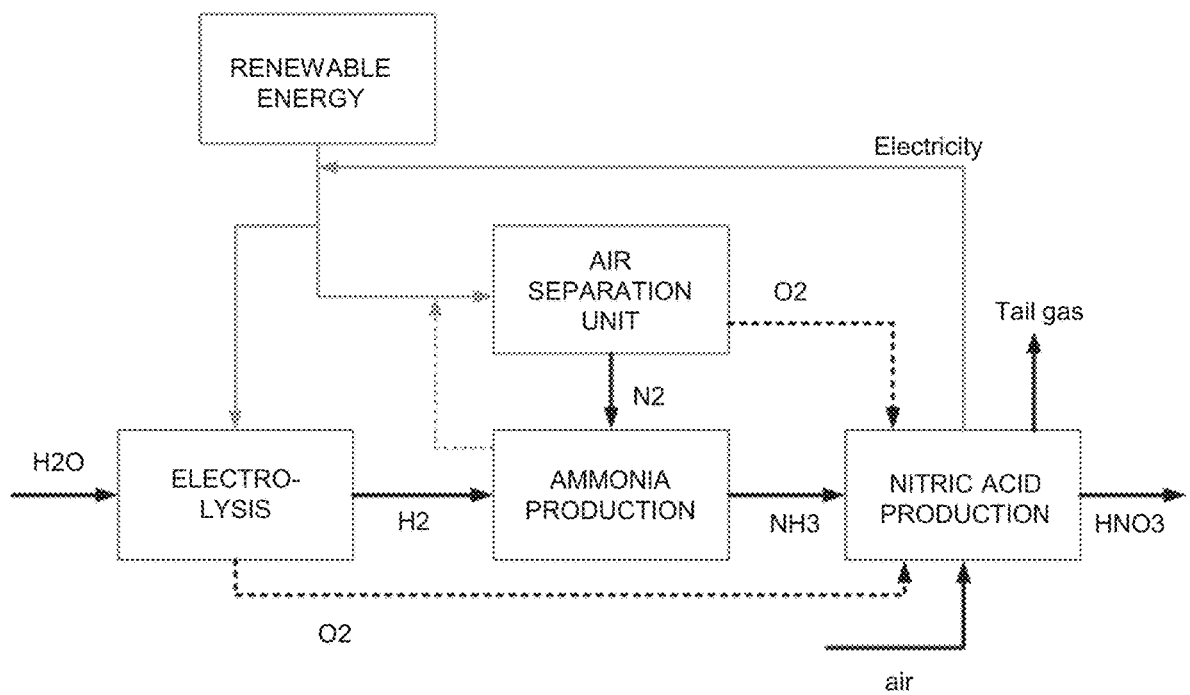
FIGS. 1A and 1B. Schematic flowsheet of an embodiment of an integrated ammonia—nitric acid production, showing material and energy (electricity) integration.

The following reference numerals are used in the description and figures:

| | |
|---|---|
| 100 | ammonia burner |
| 120 | oxygen supply line |
| 130 | ammonia supply line |
| 131 | ammonia buffer tank |
| 140 | Heater |
| 150 | mixing unit |
| 160 | ammonia combustion gas outlet line |
| 161 | heat exchanger |
| 162 | condenser |
| 200 | first turbine (pressurized oxygen containing fluid turbine) |
| 220 | Generator |
| 400 | Oxidizer |
| 500 | Absorber |
| 510 | pipe for concentrated nitric acid |
| 700 | Haber-Bosch loop |
| 710 | $H_2$ inlet |
| 711 | $H_2$ compressor |
| 720 | $N_2$ inlet |
| 721 | $N_2$ buffer tank |
| 722 | cryogenic pump |
| 730 | converter unit |
| 740 | separator |
| 750 | $NH_3$ outlet |
| 760 | re-compressor |
| 770 | second turbine (pressurized ammonia turbine) |
| 771 | generator |
| 780 | ammonia Rankine cycle energy recovery system |
| 781 | third turbine |
| 782 | generator |
| 783 | ammonia circulation pump |
| 790 | preheater |
| 791 | heat exchanger (in ammonia boiler) |
| 792 | waste heat exchanger |
| 793 | heat exchanger (in ammonia super heater) |
| 794 | waste heat exchanger |
| 795 | air cooled heat exchanger |
| 796 | waste heat exchanger |
| 797 | heat exchanger in ammonia condenser |
| 800 | electrolysis unit |
| 810 | $H_2$ outlet |
| 900 | air separator unit |
| 910 | $N_2$ outlet |
| 920 | $O_2$ outlet |

DETAILED DESCRIPTION OF INVENTION

Before the present systems and processes of the invention are described, it is to be understood that this is not limited to particular systems and methods or combinations described, since such systems and methods and combinations may, of course, vary. It is also to be understood that the terminology used herein is not intended to be limiting, since the scope will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, particularly +/−5% or less, more particularly +/−1% or less, and still more particularly +/−0.1% or less of and from the specified value, insofar such variations are appropriate to perform in the disclosed aspects and embodiments. It is to be understood that the value to which the modifier "about" or "approximately" refers is itself also specifically, and in particular, disclosed.

Whereas the terms "one or more" or "at least one", such as one or more or at least one member(s) of a group of members, is clear per se, by means of further exemplification, the term encompasses inter alia a reference to any one of the members, or to any two or more of the members, such as, e.g., any≥3, ≥4, ≥5, ≥6 or ≥7 etc. of the members, and up to all the members.

All references cited in the present specification are hereby incorporated by reference in their entirety. In particular, the teachings of all references herein specifically referred to are incorporated by reference.

Unless otherwise defined, all terms used herein, including technical and scientific terms, have the meaning as commonly understood by one of ordinary skill in the art. By means of further guidance, term definitions are included to better appreciate the teaching as described herein.

In the following passages, different aspects are defined in more detail. Each aspect so defined may be combined with any other aspect or aspects unless clearly indicated to the contrary. In particular, any feature indicated as being particular or advantageous may be combined with any other feature or features indicated as being particular or advantageous.

Reference throughout this specification to "one embodiment" or "an embodiment" means that a particular feature, structure or characteristic described in connection with the embodiment is included in at least one embodiment as described herein. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those skilled in the art. For example, in the claims and/or numbered statements specified herein, any of the specified embodiments can be used in any combination.

In the present description, reference is made to the accompanying drawings that form a part hereof, and in which are shown by way of illustration only of specific embodiments in which the invention may be practiced. Parenthesized or emboldened reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention is defined by the appended claims.

The pressures provided herein are expressed as absolute pressures. Accordingly, when the unit "bara" is used in the present disclosure, the absolute pressure is signified. In other words, the unit "bara" as used herein refers to the pressure including atmospheric pressure.

The inventors have developed a novel concept for a high energy and material efficient nitric acid production process and system, particularly a high energy and material efficient nitric acid production process and system combined and integrated with an ammonia production process and system, which at least partially overcome the above mentioned disadvantages of using renewable energy sources. Particularly, the nitric acid production process and system as detailed herein is configured to recover a high amount of energy out of the ammonia combustion and oxidation, and particularly also out of the NO oxidation, water vapour condensation (which corresponds to about a third of the heat released in combustion) and $HNO_3$ absorption, particularly in the form of electricity, such as having a thermal efficiency of more than 20%, such as more than 25% or 30%, while maintaining a high nitric acid recovery in the conversion of ammonia to nitric acid. Advantageously, the generated electricity is returned to the ammonia production process and system, particularly an electrolysis based ammonia production.

In general, the novel concept for a highly energy and material efficient nitric acid production process and system may comprise one or more enhanced energy recovery and electricity generating measures, measures directly related to implementing the energy recovery and electricity generating measures in a nitric acid production process or a combined, integrated ammonia-nitric acid production process, and/or measures for the integration of the electrolyzers, the Haber-Bosch loop/ammonia production and the nitric acid production. Several energy recovery or energy efficiency promoting measures are contemplated in the present application, which may be applied on their own or in parallel in order to achieve an optimal energy efficiency and an enhanced energy recovery, including enhanced energy efficiency and/or recovery from an ammonia and/or nitric acid production process using pressurized liquefied gases (e.g. air, $N_2$).

Generally described herein is a process and system for producing nitric acid with enhanced energy recovery and/or enhanced energy efficiency, particularly by an enhanced product- and energy-based integration of a front end ammonia production process/system and a back end nitric acid production process/system, such as by providing energy, particularly electricity, recovered in the nitric acid production to the front end process/systems and by providing products, e.g. oxygen, ammonia, from the front end ammonia production to the nitric acid production, particularly in combination with applying novel operating conditions in the nitric acid and/or ammonia production process or system, such as providing or converting an oxygen containing fluid and/or $N_2$ stream in a liquid state and subsequently pressurizing the liquid streams, in particular followed by the further heating of the pressurized liquid stream to evaporate and superheat the pressurized liquid stream.

An embodiment of the integrated ammonia and nitric acid production is shown in FIG. 1, illustrating a main concept as described herein. In contrast to the material and energy flow integrated production process considered herein, in the current state-of-the-art, traditional nitric acid production process, the front end producing ammonia is typically separated from the back end making nitric acid, with little integration: both processes are designed and optimized to essentially stand and operate alone.

As shown in FIG. 1A, energy/electricity from renewable sources is supplied to an electrolysis unit and the air separation unit, for the production of hydrogen and nitrogen, respectively. In addition, both the electrolysis unit and the air separation unit produce oxygen. The hydrogen and nitrogen are both fed into an ammonia production unit, such as a Haber Bosch loop. The produced ammonia is then supplied to a nitric acid production process, where it is burnt with oxygen and converted into nitric acid.

This oxygen can be supplied via air, but, advantageously, oxygen generated by the electrolysis unit and/or air separation unit is used, thus intensifying the nitric acid production. The ammonia combustion produces a vast amount of heat, which is converted into electricity, based on a nitric acid production process with enhanced energy recovery measures as described herein. The generated electricity is led back to the electricity demanding processes of the ammonia production, in particular the electrolysis and air separation.

Figure 1B:
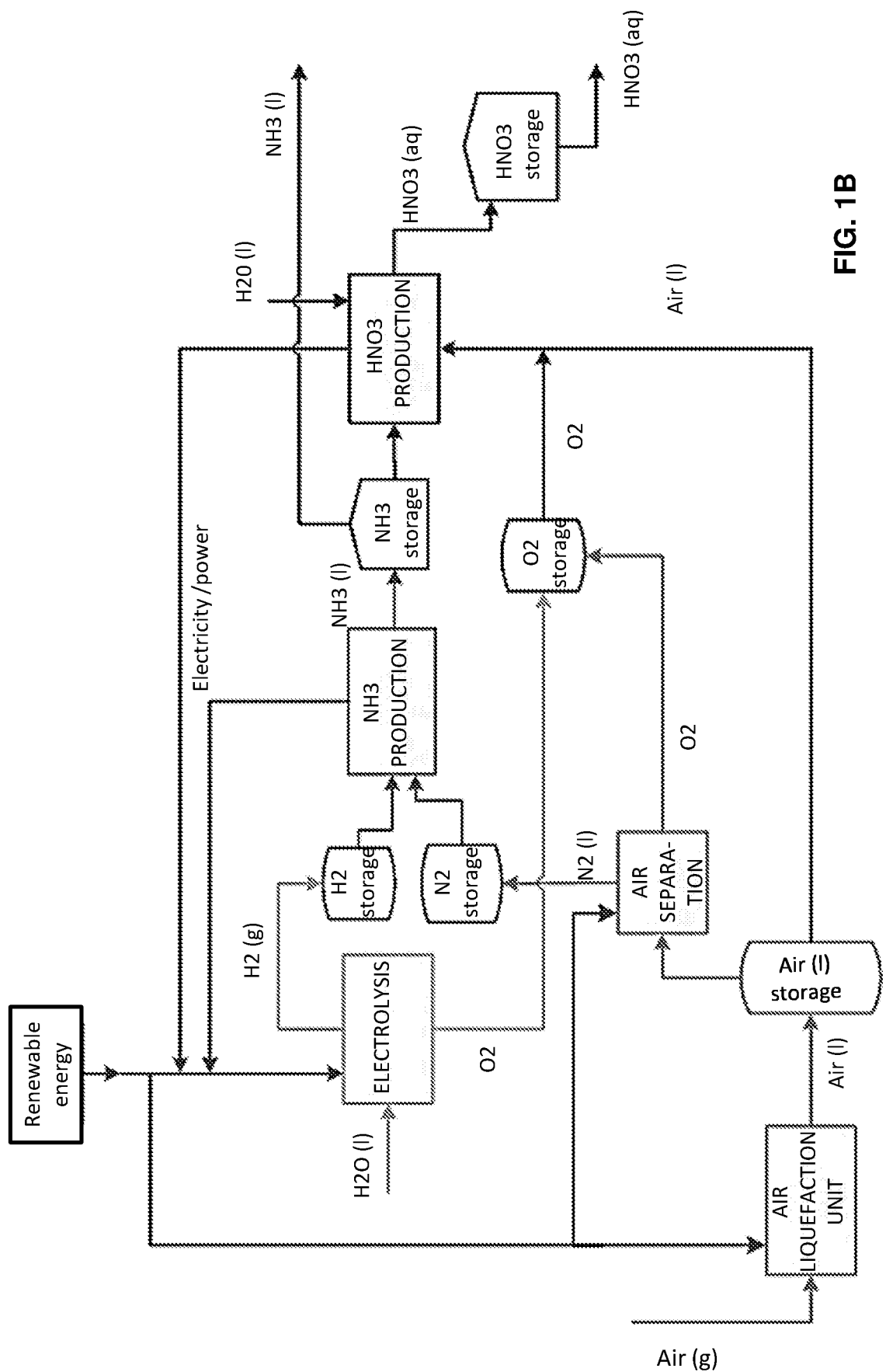

This concept is also further illustrated in FIG. 1B, showing an embodiment of the integrated ammonia and nitric acid production of the present application, the embodiment allowing to at least partially address the intermittency issues of renewable energy.

Energy/electricity from renewable sources is supplied to an electrolysis unit, an air liquefaction unit and an air separation unit. Liquid air (or oxygen), $N_2$ and ammonia can be made and stored while there is a surplus of renewable power. For instance, liquid air can be stored in large vessels at −190° C. and about 5 bar, thus contributing to overcoming the intermittency issues with renewable energy. The liquid air may be consumed by the air separation unit, to generate liquid $N_2$ (for the ammonia production) and $O_2$, (e.g. for the ammonia combustion/oxidation in the nitric acid plant). Advantageously, both liquid nitrogen and oxygen can easily be stored. The hydrogen and nitrogen are provided to an ammonia production system and the produced ammonia can be stored as well and thus acts as an intermediate energy storage medium: the combustion of ammonia produces a vast amount of heat, which can be converted into electricity, as described herein. This process is particularly relevant when the renewable energy is not or only to a limited extent available. As further detailed herein, the use of liquid air or liquid oxygen (in the nitric acid production) and liquid $N_2$ (in the ammonia production) contribute to the energy efficiency and energy recovery of the process described in the present application.

The different embodiments of a nitric acid production process and system described herein, particularly a combined and integrated ammonia and nitric acid production process and system present numerous advantages:

The processes and systems envisaged herein efficiently use the energy stored in the ammonia. In particular, the energy recovered in the nitric acid production from the combustion of ammonia, particularly in the form of electricity, which is returned to the electrolysis based ammonia production (or another upstream processes of the nitric acid production, e.g. air liquefaction), contributes to overcoming the power intermittency when using renewable energy sources. In some embodiments, the ammonia produced in the ammonia production section of a combined and integrated ammonia and nitric acid production process can be seen as an intermediate energy storage medium, like a battery, to be used when sufficient renewable energy is not available, to maintain a good utilization of the electrolyzer and the Haber-Bosch ammonia loop. Ammonia combustion thus provides the electricity for the front end ammonia production, concomitantly with the production of nitric acid.

It allows setting up small scale chemical plants for producing ammonia, nitric acid and/or nitrate based fertilizers, which can be located close to the market. This way, the high transport and handling costs associated with large scale plants that are typically located remote from the end markets can be overcome. The electrification of $H_2$ production via electrolysers may contribute to enabling such smaller scaled, flexible plants by simplifying the ammonia production technology and by capitalising on intermittent, renewable cheap power.

The present application generally provides for a process and system for producing nitric acid with enhanced energy efficiency, particularly an integrated and combined ammonia and nitric acid production process and system with an enhanced energy efficiency, comprising the use of liquid air, oxygen, nitrogen, and/or ammonia streams, particularly wherein the liquid streams are pressurized in a liquid state and subsequently heated to evaporate the liquid.

The use of the liquefied gases as contemplated herein contributes in different ways to the energy efficiency and recovery of the nitric acid production process. This is particularly advantageous when the gases are liquefied using renewably energy, particularly when renewable energy is widely available. The compression or pressurization of a liquid requires significantly less energy than pressurizing a gas to the same extent. In particular, the use of the liquid oxygen, therefore, allows to recover a significant amount of energy (e.g. about 2.4 $MWh/t_{NH3}$).

In addition, the pressurized liquid may be evaporated and heated further using low grade waste heat generated in the nitric acid process, such as the heat recovered in the oxidizer, condenser and absorber sections of the nitric acid process. The thus obtained pressurized and heated gas may be subsequently expanded over a turbine, which is particularly operationally coupled to a turbine to generate electricity. This way, the low grade heat of the nitric acid process can be upgraded to electrical energy.

A first aspect of the present application provides a process for producing nitric acid, comprising the steps of
  (i) optionally, providing $H_2$ and $N_2$ to an ammonia production unit or Haber-Bosch synthesis loop and generating ammonia therein;
  (ii) providing a combustion mixture comprising ammonia and an oxygen containing fluid, such as air or oxygen, to the ammonia burner and catalytically combusting ammonia in the ammonia burner, thereby generating an ammonia combustion gas stream, which comprises nitric oxide;
  (iii) oxidizing the nitric oxide in the ammonia combustion gas stream, such as in a dedicated oxidizer unit—thereby obtaining a stream comprising nitrogen dioxide;
  (iv) absorbing the nitrogen dioxide in an aqueous solution in an absorber thereby forming an aqueous stream comprising nitric acid;
  wherein the process further comprises the step of providing or converting $N_2$ and/or the oxygen containing fluid, such as air, oxygen enriched air, or oxygen, in a liquid state, prior to their introduction in the Haber-Bosch loop and the ammonia burner, respectively.

The process of the present application further comprises the steps of: (v)-pressurizing the liquid $N_2$ of step (i) and/or the liquid oxygen containing fluid of step (ii), thereby obtaining one or more pressurized liquid streams; and
  (vi) subsequently evaporating the one or more pressurized liquid streams, thereby obtaining one or more evaporated pressurized streams (i.e. in the gaseous state), and, optionally, further heating of the one or more evaporated pressurized streams, particularly using the heat recovered from the ammonia and/or nitric acid production process, such as from the ammonia combustion process, the oxidizer unit and/or the nitric acid absorber, via one or more heat exchangers.

(vii) expanding the heated evaporated pressurized streams over a turbine, which is particularly operationally coupled to a generator for generating electricity. In specific embodiments, the heated evaporated pressurized $N_2$ and/or oxygen containing gas is expanded over a turbine, which is particularly operationally coupled to a generator for generating electricity, prior to the introduction of $N_2$ to the Haber Bosh process or the introduction of the air or oxygen in the ammonia burner. In certain embodiments, the expansion of the heated evaporated pressurized streams, in particular the expansion of the heated evaporated pressurized oxygen containing gas, occurs in two or more stages.

Advantageously, in this process the waste heat, particularly low grade waste heat, generated in the nitric acid process (in the combustion of ammonia, in the oxidation of NO and/or in the absorption of $NO_2$ in water) and the production of ammonia (e.g. waste heat generated by an electrolysis unit) can be efficiently recovered and converted in electrical power, due to the high temperature difference between the (low grade) waste heat and the pressurized liquefied gases. As used herein, the term "low grade waste heat" refers to heat at a temperature below 100° C. Advantageously, the generated electricity can be e.g. at least partially utilized for operating the electrolysis unit and/or the air separation unit. The liquefied gases can be utilized in the production of nitric acid from ammonia and/or in the production of ammonia from $H_2$ and $N_2$.

Accordingly, certain embodiments of the current aspect contemplated herein generally relate to a nitric acid process or system, wherein a liquid oxygen containing fluid, such as liquid air or liquid oxygen-enriched air, is used to enhance the energy efficiency and energy recovery of the nitric acid production. Such a process for the production of nitric acid comprises the steps of:

(i) providing a liquid oxygen containing fluid (a liquefied oxygen containing gas), particularly at ambient pressure, and subsequently pressurising the liquid oxygen containing fluid up to a pressure of at least 50 bara, such as at least 100 or 150 bara, particularly up to a pressure of between 150 and 250 bara, such at approximately 200 bara.

(ii) evaporating the pressurized liquid oxygen containing fluid by heating the pressurized liquid oxygen containing fluid by low grade waste heat, produced downstream of the ammonia burner of the nitric acid process, and further heating/overheating of the evaporated pressurized oxygen containing fluid, particularly by waste heat of the nitric acid process;

(iii) expanding the hot, pressurized gaseous oxygen containing fluid over a turbine, thus generating a cooled oxygen containing fluid stream having a pressure of between 10 and 30 bara and a temperature of between −180° C. and 25° C., and particularly recovering power, i.e. electricity, by operationally coupling the turbine to a generator;

(iv) optionally reheating the cooled oxygen containing fluid stream by waste heat streams to a temperature of between 25° C. and up to 300° C. or even above 300° C., mixing the heated oxygen containing fluid with ammonia and providing the ammonia/oxygen-containing fluid mixture to the ammonia burner.

(v) catalytically combusting the ammonia/oxygen-containing-fluid mixture in an ammonia burner, thereby forming a stream comprising nitric oxide subsequently oxidizing the nitric oxide to nitrogen dioxide and absorbing the nitrogen dioxide in water, thereby producing nitric acid.

In particular embodiments, the oxygen containing fluid is air or oxygen enriched air.

In particular embodiments, the combustion gases leaving the ammonia burner are subject to one or more cooling steps before the oxidation and/or absorption steps and the heat removed in these cooling steps prior to the oxidation and absorbing steps is used to provide heat to the oxygen containing fluid streams of step (ii) and/or (iv). Accordingly, in particularly embodiments, step (v) further comprises the step of recovering the heat generated by the ammonia combustion, by the NO oxidation, by the $NO_2$ absorption and/or by condensation via multiple cooling units (i.e. heat exchangers configured to take up the heat in a nitric acid process stream, such as the ammonia combustion gas stream, the gas stream comprising nitrogen dioxide and the gas streams in the absorption stage, thus cooling and/or condensing the nitric acid process stream) and providing this heat to the oxygen containing fluid streams of step (ii) and (iv) for evaporating the pressurized liquid oxygen, oxygen enriched air or air, and for the heating or superheating of the evaporated pressurized liquid oxygen, oxygen enriched air or air, via multiple heater units (i.e. heat exchangers configured to provide heat to the air stream). It is understood that a cooling unit in the nitric acid production process is thus in thermal connection with a heating unit in contact with the oxygen containing fluid (air) process stream. In particular, a cooling unit situated in a cool part of the nitric acid production process (e.g. with temperatures between 20° C. and 100° C., such as the condensation or absorption step, or after the condenser—which produces low grade waste heat) is in thermal connection with a heating unit in contact with a cold oxygen containing fluid (air) stream (e.g. for the evaporation of the pressurized liquid air stream); and/or a cooling unit situated in a hot part of the nitric acid production process (e.g. after the ammonia burner or the oxidizing section) is in thermal connection with a heating unit in contact with a warm or hot oxygen containing fluid (air) stream (e.g. for heating and superheating the evaporated pressurized liquid air stream).

It is understood that step (v) may correspond to a conventional nitric acid process flow, as referred to in the Background section, i.e. comprising a tail gas expander and a boiler to extract heat for steam, which may be subsequently at least partially used to produce electrical power in a steam Rankine cycle.

In further embodiments, the nitric acid production process and system as contemplated herein may be integrated with a liquid air production process or system, in order to reduce the energy requirement in the air liquefaction process or system.

As already mentioned above, energy recovery by using liquefied gases and pressurization of the liquid fluid, can be implemented in the production of ammonia from $H_2$ and $N_2$ as well.

Accordingly, certain embodiments of the current aspect of the present application generally relate to an ammonia production process or system, in particular a combined ammonia and nitric acid process or system, wherein liquid nitrogen is used to enhance the energy efficiency and energy recovery of the ammonia and/or nitric acid production.

Such a process for the production of ammonia and, particularly, nitric acid comprises the steps of:
(i) providing liquid nitrogen, particularly at ambient pressure, and subsequently pressurising the liquid nitrogen up to a pressure of at least 50 bara, such as at least 100 or 150 bara, particularly up to a pressure of between 150 and 250 bara, such at approximately 200 bara.
(ii) evaporating the pressurized liquid nitrogen by heating the pressurized liquid nitrogen, such as in an ammonia condenser. It is thus understood that the cryogenic nitrogen is used to condense and to recover the ammonia produced in the further process steps;
(iii) mixing the nitrogen stream of step (ii) with hydrogen gas, which has been pressurized, and with a compressed recycle stream, the recycle stream being generated by a separator unit situated after the ammonia converter reactor, thereby obtaining a gaseous reaction mixture; and preheating the gaseous reaction mixture;
(iv) supplying the gaseous reaction mixture of step (iii) to an ammonia converter reactor, forming part of a Haber-Bosch synthesis loop, and generating an ammonia containing product stream in the ammonia converter;
(v) removing heat from the ammonia containing gas stream via one or more heat exchangers, and separating the ammonia from the unreacted nitrogen and hydrogen in a separator unit, thereby obtaining a recycle stream comprising nitrogen and hydrogen and an ammonia stream, comprising liquid ammonia, wherein the liquid ammonia stream is used to recover heat from the process by means of one or more heat exchangers and one or more turbines, which are, in particular, operationally coupled to a generator.

In particular embodiments, the liquid ammonia stream is at least partially passed to an ammonia Rankine cycle or an ammonia Rankine cycle based energy recovery system. Advantageously, the ammonia Rankine cycle based energy recovery system comprises an ammonia condenser adapted to exchange heat with the pressurized liquid nitrogen, as detailed in step (ii).

Advantageously, by implementing an ammonia Rankine cycle in the ammonia production process, it can replace a steam Rankine cycle, thus reducing the complexity and cost of having an additional steam system. In addition, an Ammonia Rankine cycle using ammonia as working fluid is more efficient in capturing low grade heat in view of the lower boiling point of ammonia. It is understood that the use of the ammonia Rankine cycle is not limited to the ammonia production process, but can be used more widely in the full process. It can be used to capture low grade heat from various sources around the overall process, such as from the electrolysers, the heat that is left in the nitric acid process, and the compressors. The energy recovered here can be used for, for instance, powering the electrolyzer, and/or the energy consuming steps of the ammonia or nitric acid processes.

Another aspect of the present application provides a system for producing nitric acid configured for executing a process for producing nitric acid according to the present invention, the system comprising
an ammonia burner, comprising a catalyst, configured for catalytically combusting a combustion mixture comprising ammonia and air and/or oxygen at an elevated pressure to form a stream comprising nitric oxide;
an oxygen supply line, configured for providing an oxygen containing fluid, such as $O_2$, air or oxygen-enriched air, to the ammonia burner;
an ammonia supply line, configured for providing ammonia to the ammonia burner;
an ammonia combustion gas outlet line, configured for removing a stream comprising nitric oxide from the ammonia burner, in fluid connection via an oxidizing section or oxidizer unit, configured for oxidizing the nitric oxide into nitrogen dioxide, to an absorber, configured for absorbing nitrogen dioxide in water, thereby yielding nitric acid;
wherein the oxygen supply line comprises an energy recovery system, wherein the energy recovery system comprises consecutively a means for pressurizing the oxygen containing fluid in the liquid state, such as a cryogenic pump; one or more heaters configured for evaporating and further heating of the pressurized oxygen containing fluid, and a first turbine, such as a high pressure turbine, configured for expanding the oxygen containing fluid (in gaseous form), particularly operationally coupled to a generator, wherein an outlet of the turbine is in fluid connection with the ammonia burner.

In particular embodiments, the nitric acid production system further comprises an ammonia production system, the ammonia production system comprising a Haber-Bosch synthesis loop, the Haber-Bosh synthesis loop comprising a $H_2$ inlet; a $N_2$ inlet; a converter unit configured for catalytically converting $H_2$ and $N_2$ into ammonia, thereby obtaining an ammonia product mixture, the converter unit comprising an ammonia product mixture outlet; a separator located downstream of the converter and configured for separating the ammonia product mixture in an ammonia stream and a stream comprising unreacted $H_2$ and $N_2$; means for recycling the unreacted $H_2$ and $N_2$, and an ammonia outlet; wherein the ammonia outlet is in fluid connection with the ammonia supply line. In particular embodiments, the ammonia production system further comprises an ammonia Rankine cycle based energy recovery system which is in fluid connection to the ammonia outlet, comprising a third turbine configured to extract work from the ammonia working fluid; a heat exchanger, an ammonia condenser in thermal connection with the $N_2$ supply line, in particular, in thermal connection with the $N_2$ supply line downstream of the means for pressurizing the liquid $N_2$ in the $N_2$ supply line; an ammonia circulation pump; and an ammonia outlet in fluid connection with the ammonia supply line.

The system according to the present invention may comprise one or more additional units, such as an electrolysis unit, configured for decomposing water in $H_2$ and $O_2$ by means of an electrical current; an air liquefaction unit, configured for converting gaseous air into liquid air; in fluid connection with the oxygen supply line, an air separation unit; configured for the separation of air into $O_2$ and $N_2$, in particular into liquid $O_2$ and liquid $N_2$; one or more heat exchangers, configured for capturing the waste heat from the ammonia combustion process, and a condenser, for condensing the water in the ammonia combustion gas, optionally thermally coupled with the heaters located on the oxygen supply line; a mixing unit in fluid connection and linked with the ammonia supply line and the oxygen containing fluid line; a means for pressurizing the liquid $N_2$ in the $N_2$ supply line and, particularly a means to exchange heat between the liquid pressurized nitrogen and the ammonia Rankine cycle based energy recovery system; a second turbine configured for expanding the ammonia stream separated in the separator, particularly operationally coupled to a generator.

In some embodiments, the ammonia burner is configured for operating at a pressure of at least 1.1 bara, more in particular at least 1.2 bara, at least 1.3 bara, at least 1.4 bara, at least 1.5 bara, at least 2.0 bara, at least 2.5 bara, at least 3.0 bara, at least 4.0 bara, at least 5.0 bara.

The systems and methods of the present aspect allow producing nitric acid in a more energy efficient way. In particular, more energy released in the various process steps (combustion, oxidation, and absorption) are recovered. This extracted energy can be converted to electrical energy, using generators. The electrical energy can be used, for example, to power water electrolysers for the production of hydrogen for use in ammonia manufacture. In addition, liquid air, nitrogen and/or ammonia can be generated in surplus when energy from renewable sources is widely available, and can easily be stored. When energy from renewable sources is insufficiently available, the stored air and ammonia can be used to generate nitric acid, while the recovered energy, particularly recovered in the nitric acid production process, is used to power the upstream processes (e.g. ammonia production).

In particular embodiments, standard, off-the-shelf turbines are used. This allows standardization and therefore reduces costs related to the use of one-of-a-kind components.

The present systems and methods are compatible with nitric acid production. Accordingly, learning curve-related cost reductions can be obtained by making many identical, standardized, nitric acid plants.

The production process and system of nitric acid, particularly the combined and integrated production process and system of ammonia and nitric acid, as contemplated in the present application in the different aspects and embodiments described herein, may further comprise a step of and/or means/systems for further processing the nitric acid to a fertilizer product, such as an ammonium nitrate or calcium nitrate fertilizer product.

The present invention is further illustrated by the following examples and illustrative embodiments.

EXAMPLES

Example 1

Figure 2A:
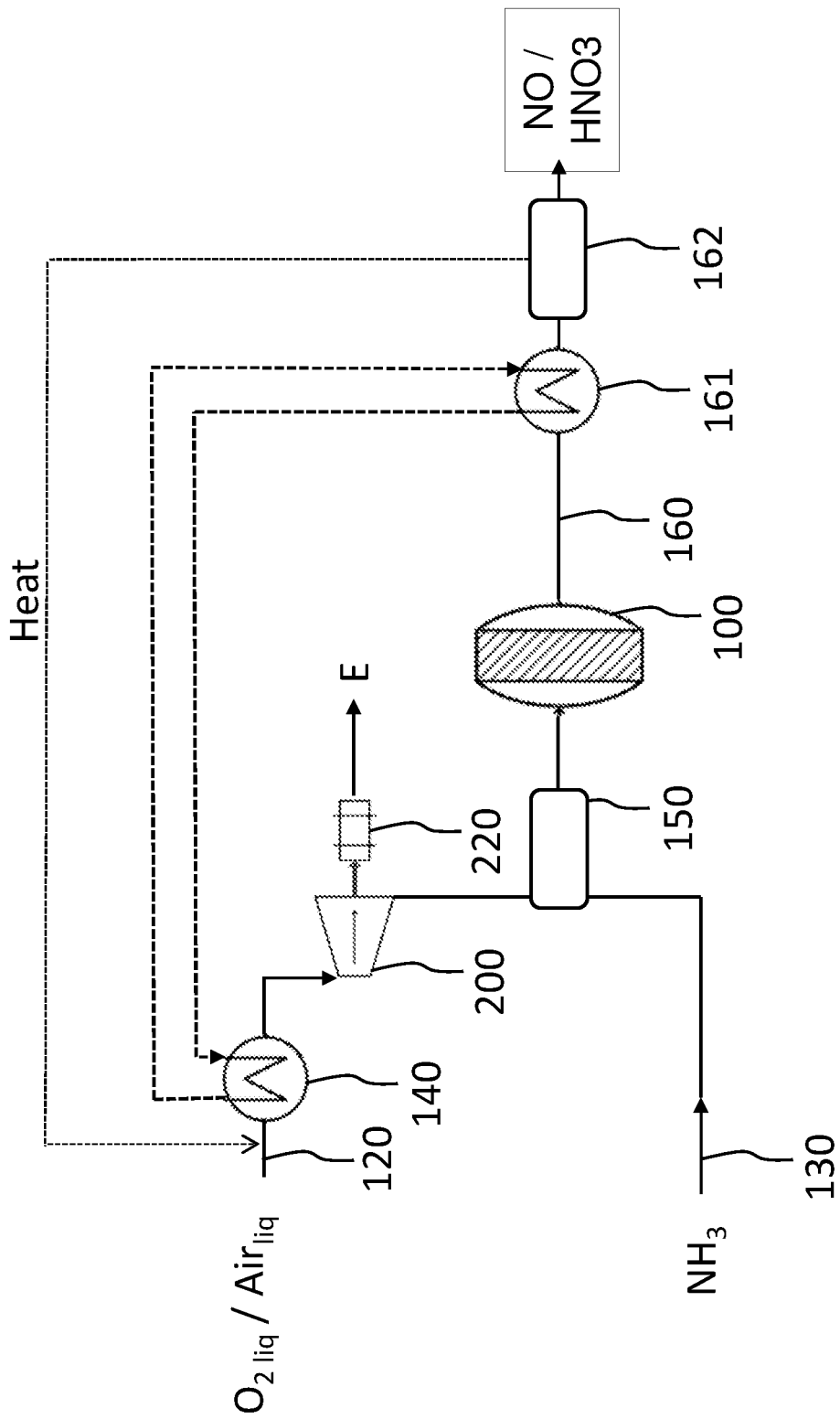
FIG. 2A shows an embodiment of a process for manufacturing nitric acid as provided herein, wherein liquid air/oxygen is pressurized, heated/evaporated and expanded over a turbine, prior to mixing with ammonia and supplying the ammonia and air/oxygen mixture to the burner.

FIG. 2A shows an embodiment of a process for manufacturing nitric acid as provided herein, depicting how energy can be recovered from the burning of ammonia in the production of nitric acid. The ammonia is supplied via an ammonia supply line (130), where it is first mixed with oxygen containing fluid in mixing unit (150), before it is fed through a burner (100), which comprises a catalyst. The ammonia combustion gas leaves the burner (100) via the ammonia combustion outlet line (160). The oxygen containing fluid, in particular air, oxygen-enriched air or $O_2$, is supplied via an oxygen supply line (120) in a liquid form, here liquid oxygen ($O_2$) or liquid air. The liquid oxygen containing fluid is evaporated and superheated with the aid of one or more heaters (140) on the oxygen supply line (120). The one or more heaters (140) subtract heat from one or more heat exchangers (161) and/or condenser (162) on the ammonia combustion outlet line (160). The superheated oxygen containing fluid is expanded over a first turbine (200), before it is mixed with the ammonia and fed into the burner (100). The first turbine is mechanically coupled to a generator (220), which may be used to produce electrical energy (E), a form of recycled energy. In certain embodiments, the expansion of the superheated oxygen containing fluid occurs in two or more stages, with reheating of the oxygen containing fluid stream by a heat exchanger between the different expansion stages. In other embodiments, the ammonia-air mixture may also be preheated before entering the ammonia burner.

Figure 2B:
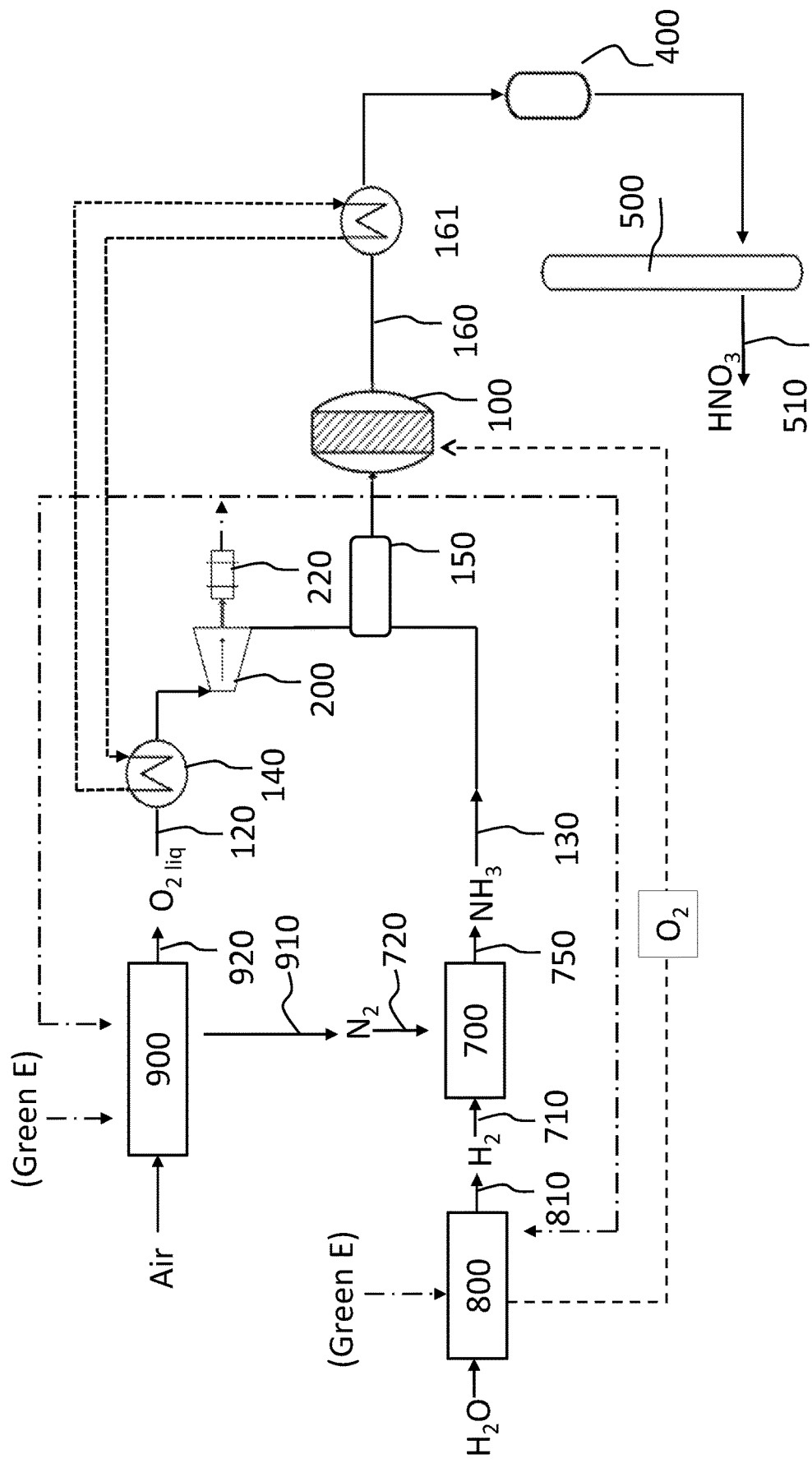
FIG. 2B shows an embodiment of a process for manufacturing nitric acid as provided herein, in addition showing that the ammonia is produced from electrolysis generated hydrogen.

FIG. 2B shows an embodiment of a process for manufacturing nitric acid as provided herein, depicting the same principle for energy recovery as in FIG. 2A, but is now further combined with an electrolysis based ammonia production process. In the nitric acid production section, the ammonia combustion gas is provided to an oxidiser (400) for converting NO into $NO_2$, and subsequently to an absorber (500) where the $NO_2$ forms nitric acid upon absorption in water. The nitric acid can leave the absorber (500) via the pipe for concentrated nitric acid (510). The supplied ammonia is made onsite of the nitric acid system in an integrated Haber-Bosch loop (700), wherein the ammonia outlet (750) of the Haber-Bosch loop is coupled to ammonia supply line (130). $H_2$ is supplied to the Haber-Bosch loop (700) via $H_2$ inlet (710), and is produced in an electrolysis unit (800), wherein water is electrolysed in $H_2$ and $O_2$, at least partially using renewable energy and electrical energy recovered in the nitric acid production system, such as by the first turbine (200) and generator (220). The electrolysis unit (800) is integrated into the nitric acid production system, by coupling the $H_2$ outlet (810) of the electrolysis unit (800) with the $H_2$ inlet (710) of the Haber-Bosch loop (700). The $O_2$ formed in the electrolysis unit (800) may be used in the burner (100). Air is separated in an air separator unit (900) in which $N_2$ leaves the air separator unit (900) via the $N_2$ outlet (910); and $O_2$ which leaves the air separator (900) via $O_2$ outlet (920). The air separator is integrated in the nitric acid production system, by coupling the $N_2$ outlet (910) of the air separator (900) to the $N_2$ inlet (720) of the Haber-Bosch loop (700) and by coupling the $O_2$ outlet (920) of the air separator (900) to the oxygen supply line (120). The air separator unit may be powered at least partially by renewable (green) energy or by electrical energy recovered elsewhere in the nitric acid production system, for example via the first turbine (200), which is coupled to a generator (220).

Ammonia may be stored in the ammonia supply line, for example in a buffer tank. The stored ammonia may be used as an energy reserve, as it can release a lot of energy when combusted in the burner in the nitric acid production process.

In particular, the oxygen containing fluid in line (120) may be superheated in different stages, consecutively by multiple heaters.

For instance, a first heater may be located on a so-called "cooling loop", wherein heat is taken up in the absorber (500) and, subsequently, this heat is used to evaporate or further heat the pressurized oxygen containing fluid. For instance, a second heater may be used to further heat the evaporated oxygen containing fluid, by means of the heat recovered by a heat exchanger/condense). For instance, a third heater may recover heat from a heat exchanger close to the ammonia burner. Typically, the working fluid in the different cooling/heating loop is circulated by a circulation pump. The working fluid as used herein can be any type of working fluid suitable for this particular purpose and chosen by the skilled person, for instance compressed water/butane. The working fluid is typically chosen based on the pressure and temperature at which the heat exchange occurs.

Example 2

Figure 3:
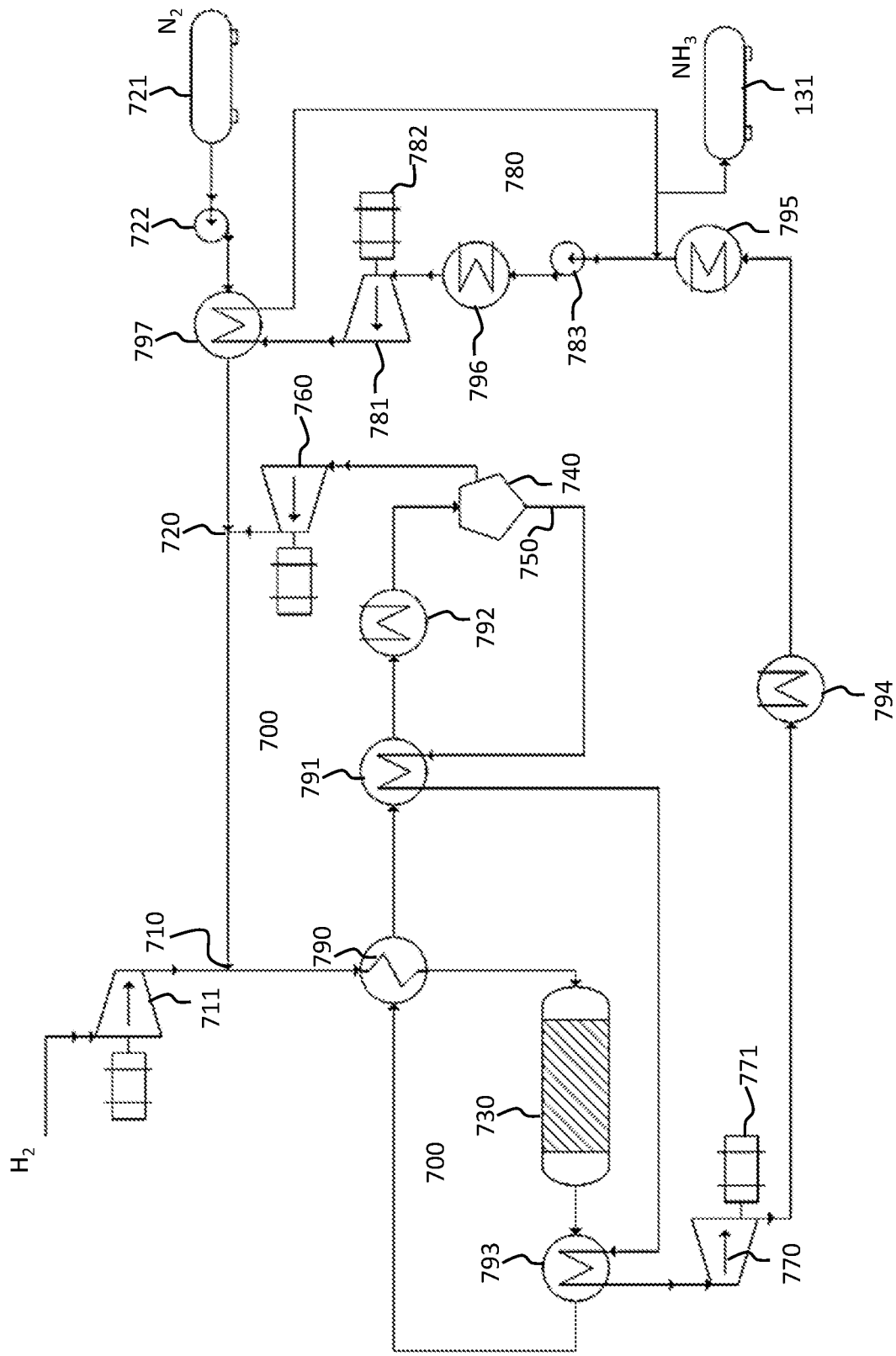
FIG. 3 shows an embodiment of a combined process for manufacturing ammonia and nitric acid as provided herein, wherein a liquid and pressurized $N_2$ stream is used in the ammonia production.

FIG. 3 shows an embodiment of a combined process for manufacturing ammonia and nitric acid as provided herein, wherein a liquid and pressurized $N_2$ stream is used in the ammonia production, depicting how energy can be recovered in a Haber-Bosch loop (700) based on liquid nitrogen. In this embodiment, $N_2$ is supplied in a liquid form from a $N_2$ buffer tank (721) or directly from an air separation unit. The liquid $N_2$ is pressurised with a cryogenic pump (722) and subsequently evaporated in a heater/evaporator (797), before it enters the Haber-Bosch loop (700) via the $N_2$ inlet (720). The $N_2$ is mixed with $H_2$ via a $H_2$ inlet (710) (wherein the $H_2$ gas is compressed in the $H_2$ compressor (711)) and with the recycled unreacted $N_2$ and $H_2$, which are compressed in a compressor (760). The mixture comprising $N_2$ and $H_2$ is preheated in a preheater (790) before it enters the converter unit (730), where it undergoes an exothermic reaction, producing a hot reaction mixture of ammonia and unreacted $H_2$ and $N_2$. The reaction mixture is provided to a separator (740), where an ammonia stream is separated from the unreacted $H_2$ and $N_2$, with the latter being recycled and returned to the Haber-Bosch loop. Heat is removed from the reaction mixture in different stages. In a first stage, heat is removed by a heat exchanger (793), which functions as a super heater for the (gaseous—due to being evaporated in heat exchanger 791) separated ammonia stream. In a second stage, heat is removed in a preheater (790), where the heat is transferred to the mixture of $H_2$ and $N_2$ before it enters the converter unit (730). In a third stage heat is removed in a heat exchanger (791), which functions as a boiler for the separated ammonia. In a fourth stage, the ammonia in the reaction mixture is condensed in a waste heat exchanger (792), before it enters a separator (740), which comprises an ammonia outlet (750). In the separator (740), the ammonia is separated as a liquid, which is boiled in the evaporator/heat exchanger (791). The formed gaseous ammonia is superheated in a heat exchanger (super heater) (793). The superheated ammonia is expanded over a third turbine (770), which is mechanically coupled with a generator (771), for energy recovery. The expanded ammonia is further cooled down in a waste heat exchanger (794) and an air cooled heat exchanger (795). The cooled down ammonia, enters an ammonia Rankine cycle based energy recovery system (780), where it is circulated by a circulation pump (783), heated by a waste heat exchanger (796), before it is expanded over a fourth turbine (781), which is mechanically coupled to a generator (782) for energy recovery. The expanded ammonia is passed through an ammonia condenser (797), wherein heat is transferred to the supplied $N_2$. Part of the liquid ammonia leaves the ammonia Rankine cycle energy recovery system (780) to be stored in an ammonia buffer tank (131) or to be fed into the burner (100) for catalytic combustion in the production of nitric acid.

The invention claimed is:

1. A process for producing nitric acid, comprising the steps of:
    (a) catalytically combusting a mixture of ammonia and an oxygen containing fluid, in an ammonia burner, thereby forming an ammonia combustion stream comprising nitric oxide;
    (b) oxidizing at least partially the nitric oxide in the ammonia combustion stream of step (a) to nitrogen dioxide;
    (c) absorbing in an aqueous solution, by means of an absorber, the nitrogen dioxide contained in the stream of step (b), thereby forming a concentrated aqueous nitric acid solution, wherein the oxygen containing fluid is supplied to the ammonia burner via an oxygen containing fluid supply line, wherein in at least one section of the oxygen containing fluid supply line the oxygen containing fluid is a liquid;
    (d) increasing the pressure of the oxygen containing liquid in the oxygen containing fluid supply line thereby obtaining a pressurized oxygen containing liquid, wherein the pressurized oxygen containing liquid has a pressure of at least 10 bara;
    (e) evaporating or boiling the pressurized oxygen containing liquid obtained in step (d), thereby obtaining a pressurized oxygen containing gas; and
    (f) expanding the pressurized oxygen containing gas over a first turbine.

2. The process according to claim 1 wherein the pressurized oxygen containing gas of step (e) is further heated or superheated via at least one heater configured for recuperating heat downstream from the ammonia burner before expanding the pressurized oxygen containing gas in step (f).

3. The process according to claim 2, wherein further heating or superheating the oxygen containing fluid, is carried out with heat recuperated in the absorber; with heat recuperated in a condenser and/or with heat recuperated in at least one heat exchanger.

4. The process of claim 3 wherein the oxygen containing fluid is pressurized oxygen gas.

5. The process according to claim 2 wherein further heating or superheating the oxygen containing fluid, is carried out in a stepwise manner, by first using low grade recuperated heat, and subsequently using recuperated heat of a higher grade recovered via heat exchangers from the NO or $NO_2$ containing stream before the condenser and the absorber.

6. The process of claim 5 wherein the oxygen containing fluid is a pressurized oxygen containing gas, and the low grade recuperated heat is heat recovered from the absorber and/or condenser.

7. The process according to claim 1, further comprising the step of producing ammonia, prior to step (a), by catalytic conversion of $H_2$ and $N_2$ in a Haber-Bosch synthesis loop, thereby obtaining an ammonia product stream,
    wherein $N_2$ is provided to the Haber-Bosch synthesis loop via a nitrogen supply line, wherein in at least one section of the nitrogen supply line the nitrogen is in a liquid state, and wherein the pressure of the liquid nitrogen is increased to a pressure of at least 10 bara.

8. The process according to claim 7, comprising the step of providing the ammonia product stream to a separator for separating the ammonia, and subsequently evaporating and optionally heating or superheating the separated ammonia, using heat recovered in the ammonia and/or nitric acid production process.

9. The process according to claim 8, further comprising the step of expanding the separated ammonia.

10. The process according to claim 9, further comprising the step of cooling and condensing the expanded ammonia, and passing the condensed ammonia to a system operating according to an ammonia Rankine cycle, wherein the ammonia is used as the working fluid, and a third turbine is used to capture work from the ammonia working fluid.

11. The process of claim 9 wherein the separated ammonia is superheated over a second turbine and wherein the second turbine is coupled to a generator.

12. The process according to claim 7 wherein the pressure of the liquid nitrogen is increased to at least 50 bara with cryogenic ump or compressor.

13. The process of claim 1 wherein the pressure of the oxygen containing liquid of step (d) is at least 50 bara.

14. The process of claim 1 wherein the pressurized oxygen containing liquid is evaporated or boiled with heat recuperated downstream from the ammonia burner.

15. The process of claim 1 wherein the first turbine is coupled to a generator.

16. The process of claim 1 wherein the oxygen containing fluid is at least one of air and oxygen.

17. A system for producing nitric acid configured for executing a process according to claim 2 comprising:
- an ammonia burner, comprising a catalyst configured for catalytically combusting a combustion mixture comprising ammonia and air and/or oxygen at an elevated pressure;
- an oxygen supply line in fluid connection with the ammonia burner, for providing an oxygen containing fluid to the ammonia burner;
- an ammonia supply line, in fluid connection with the ammonia burner;
- an ammonia combustion gas outlet line, for removing the ammonia combustion gas stream comprising nitric oxide from the ammonia burner, in fluid connection via an oxidizing section or oxidizer unit, configured for oxidizing the nitric oxide into nitrogen dioxide, to an absorber, for absorbing nitrogen dioxide in water, thereby yielding nitric acid;
- wherein the oxygen supply line comprises an energy recovery system, wherein the energy recovery system comprises consecutively a means for pressurizing the oxygen containing fluid in the liquid state; one or more heaters configured for evaporating, and a first turbine configured for expanding the oxygen containing fluid in gaseous form, wherein an outlet of the turbine is in fluid connection with the ammonia burner; wherein the system further comprises
- at least one of an electrolysis unit, an air liquefaction unit and an air separation unit, wherein the electrolysis unit is configured for decomposing water in $H_2$ and $O_2$ by means of an electrical current, wherein the air liquefaction unit is configured for converting gaseous air into liquid air, in fluid connection with the oxygen supply line; and wherein the air separation unit is configured for the separation of air into $O_2$ and $N_2$; and
- wherein the first turbine is operationally coupled to a first generator, wherein said first generator is in electrical connection with the electrolysis unit and/or the air separation unit liquefaction unit.

18. The nitric acid production system according to claim 17, further comprising an ammonia production system, the ammonia production system comprising a Haber-Bosch synthesis loop, the Haber-Bosh synthesis loop comprising a $H_2$ inlet; a $N_2$ inlet; a converter unit configured for catalytically converting $H_2$ and $N_2$ into ammonia, thereby obtaining an ammonia product mixture, the converter unit comprising an ammonia product mixture outlet; a separator located downstream of the converter and configured for separating the ammonia product mixture in an ammonia stream and a stream comprising unreacted $H_2$ and $N_2$; means for recycling the unreacted $H_2$ and $N_2$, and an ammonia outlet; wherein the ammonia outlet is in fluid connection with the ammonia supply line; a heat exchanger, an ammonia condenser in thermal connection with the $N_2$ supply line; an ammonia circulation pump; and an ammonia outlet in fluid connection with the ammonia supply line.

19. The system of claim 18 further comprising an ammonia Rankine cycle based energy recovery system which is in fluid connection to the ammonia outlet, comprising a third turbine configured to extract work from the ammonia working fluid.

20. The nitric acid production system according to claim 17, further comprising at least one of the following units:
- an electrolysis unit, configured for decomposing water in $H_2$ and $O_2$ by means of an electrical current, the electrolysis unit comprising a water inlet and an $H_2$ outlet and a $O_2$ outlet; wherein the $H_2$ outlet of the electrolysis unit is in fluid connection with the $H_2$ inlet (710) of the Haber-Bosch synthesis loop (700);
- an air separation unit, configured for the separation of air into $O_2$ and $N_2$, the air separation unit comprising an $O_2$ outlet and a $N_2$ outlet, wherein the $O_2$ outlet of the air separation unit is in fluid connection with the oxygen supply line, and wherein the $N_2$ outlet of the air separation unit is in fluid connection with the $N_2$ inlet of the Haber-Bosch synthesis loop;
- at least one heat exchanger, configured for capturing the waste heat from the ammonia combustion process, and a condenser for condensing the water in the ammonia combustion gas, wherein the at least one heat exchanger and condenser are situated downstream of the ammonia burner and upstream of the absorber unit;
- a mixing unit in fluid connection and linked with the ammonia supply line and the oxygen containing fluid supply line, the mixing unit comprising a vessel, pipe or a reactor configured to mix the oxygen containing fluid and the ammonia to form a combustion mixture, prior to the introduction of the combustion mixture to the ammonia burner;
- a means for pressurizing the liquid $N_2$ in the $N_2$ supply line to a pressure of at least 100 bara; and/or
- a second turbine configured for expanding the ammonia stream separated in the separator.

21. The nitric acid production system according to claim 20 wherein the $H_2$ outlet of the electrolysis unit is in fluid connection with the $H_2$ inlet of the Haber-Bosch synthesis loop.

22. The nitric acid production system of claim 20 wherein the at least one heat exchanger and condenser are thermally coupled with the at least one heater.

23. The nitric acid production system of claim 20 wherein the second turbine is operationally coupled to a generator.

24. The system of claim 17 wherein the combustion mixture is combusted at a pressure of about 5.0 to about 20.0 bara.

25. The system of claim 17 wherein the oxygen containing fluid is $O_2$, air or oxygen-enriched air.

26. The system of claim 17 wherein the oxygen containing fluid is pressurized to a pressure of at least 10 bara.

27. The system of claim 17 wherein the at least one heater heats the pressurized oxygen containing fluid.

28. The system of claim 17 wherein the first turbine is operationally coupled to a generator.

* * * * *